(12) United States Patent
Schzukin et al.

(10) Patent No.: US 7,492,779 B2
(45) Date of Patent: Feb. 17, 2009

(54) APPARATUS FOR AND METHOD OF SUPPORT FOR COMMITTED OVER EXCESS TRAFFIC IN A DISTRIBUTED QUEUING SYSTEM

(75) Inventors: Golan Schzukin, Tel Aviv (IL); Lior Shabtay, Ganai Tikva (IL); Doron Vider, Ashkelon (IL); Yaron Raz, Ramot Meir (IL)

(73) Assignee: Atrica Israel Ltd., Herzelia (IL)

( * ) Notice: Subject to any disclaimer, the term of this patent is extended or adjusted under 35 U.S.C. 154(b) by 930 days.

(21) Appl. No.: 10/982,584

(22) Filed: Nov. 5, 2004

(65) Prior Publication Data

US 2006/0098672 A1    May 11, 2006

(51) Int. Cl.
*H04L 12/26* (2006.01)
(52) U.S. Cl. .................. 370/412; 370/235
(58) Field of Classification Search ............ 370/230, 370/230.1, 235, 412
See application file for complete search history.

(56) References Cited

U.S. PATENT DOCUMENTS

| | | | |
|---|---|---|---|
| 7,085,236 B2* | 8/2006 | Oldak et al. | 370/235.1 |
| 7,280,476 B2* | 10/2007 | Anderson | 370/235 |
| 7,283,536 B2* | 10/2007 | Ruutu et al. | 370/400 |
| 7,286,485 B1* | 10/2007 | Ouellette et al. | 370/252 |

OTHER PUBLICATIONS

Heinanen, J. et al., RFC 2597, "Assured Forwarding PHB Group", Network Working Group, Jun. 1999.
Ethernet Services Model: Phase 1, Metro Ethernet Forum, Technical Specification MEF 1, Nov. 10, 2003.
Traffic Management Specification: Phase 1, Metro Ethernet Forum, Technical Specification MEF 5, May 2004.

\* cited by examiner

*Primary Examiner*—Brian D Nguyen
(74) *Attorney, Agent, or Firm*—Howard Zaretsky; Zaretsky Patent Group PC

(57) ABSTRACT

An apparatus for and method of enforcing precedence of committed traffic over excess traffic that overcomes the difficulty in supporting committed over excess traffic and has particular application to distributed queuing systems. Queue control messages are generated and transmitted to other line cards to guarantee that committed traffic is not dropped when sent from multiple sources such as line interface cards to a single destination. When the level of a queue exceeds a threshold and flow control is received for the corresponding destination, the queue starts dropping excess traffic and messages indicating the queue status are sent to all other lines cards. When a line card receives a queue control message that another line card started dropping excess traffic to a specific destination, it also starts dropping excess traffic to that destination as well.

48 Claims, 9 Drawing Sheets

APPARATUS FOR AND METHOD OF SUPPORT FOR COMMITTED OVER EXCESS TRAFFIC IN A DISTRIBUTED QUEUING SYSTEM

FIELD OF THE INVENTION

The present invention relates to the field of data communications and more particularly relates to an apparatus for and method of support for regulating committed traffic over excess traffic in a distributed queuing system.

BACKGROUND OF THE INVENTION

The growth in demand for telecommunication services is increasing at an ever-quickening pace. The majority of the demand is being driven by the explosion in the use of the Internet and a steady stream of new applications being introduced which further increases the demand for increased bandwidth. Currently, a large portion of Internet traffic is still carried by circuit switched transport facilities. In the case of Metropolitan Area Networks (MANs), most of the traffic is transported over SONET/SDH based networks most of which were originally designed for voice traffic. With time, more and more customers are using the networks for transporting data rather than voice.

The requirements for networked communications within the user community have changed dramatically over the past two decades. Several notable trends in the user community include (1) the overwhelming domination of Ethernet as the core networking media around the world; (2) the steady shift towards data-oriented communications and applications; and (3) the rapid growth of mixed-media applications. Such applications include everything from integrated voice/data/video communications to the now commonplace exchanges of MP3 music files and also existing voice communications which have begun to migrate towards IP/packet-oriented transport.

Ethernet has become the de facto standard for data-oriented networking within the user community. This is true not only within the corporate market, but many other market segments as well. In the corporate market, Ethernet has long dominated at all levels, especially with the advent of high-performance Ethernet switching. This includes workgroup, departmental, server and backbone/campus networks. Even though many of the Internet Service Providers (ISPs) in the market today still base their WAN-side communications on legacy circuit oriented connections (i.e. supporting Frame Relay, xDSL, ATM, SONET), their back-office communications are almost exclusively Ethernet. In the residential market, most individual users are deploying 10 or 100 Mbps Ethernet within their homes to connect PCs to printers and to other PCs (in fact, most PCs today ship with internal Ethernet cards) even though the residential community still utilizes a wide range of relatively low-speed, circuit-oriented network access technologies.

The use of Ethernet, both optical and electrical based, is increasing in carrier networks due to advantages of Ethernet and particularly Optical Ethernet, namely its ability to scale from low speeds to very high rates and its commodity-oriented nature. With the rapid increase in demand for user bandwidth, and the equally impressive increase in the performance of Ethernet with the LAN environment, the demand for Metropolitan network performance is rapidly increasing. In response, there has been a massive explosion in the amount of fiber being installed into both new and existing facilities. This is true for both the corporate and residential markets.

In metro Ethernet markets, one of the parameters that can be selected is the Quality of Service (QoS). Quality of service is a term which refers to the set of performance parameters that characterize the traffic over a given connection. Several different classes or levels of QoS are defined, two of which are committed traffic and best effort traffic. To enable many services in the metro Ethernet market, a critical QoS parameter is committed information rate (CIR) versus excess information rate (EIR). Committed traffic is guaranteed to make it through the network with a very high probability of success with a very low probability of being dropped. This is a higher class of service and the customer pays a premium for it.

Excess traffic, however, is not guaranteed to make it through the network and may be provided on a best effort basis. This means that the committed traffic is serviced first and excess traffic is serviced using any bandwidth left in each section in the system. Note that EIR is usually not a service of its own but rather is the EIR portion of the same service. For example, a policer may be used at the ingress of the provider network to decide which part of the traffic of a service is excess traffic and therefore should be marked as discard-eligible, and which is committed traffic and therefore should not be marked as discard eligible. Committed and Excess traffic of a single service (and having the same priority) should use the same queue in order that there is no misordering between packets (or frames) belonging to the same service. As described below, different frames of the same service may be marked as committed or excess traffic according to the bandwidth profile defined in the Service Level Specification (SLS) of that service. From an overall network point of view, the expectation of the service provider and the customer is that if a customer pays a premium for the committed bandwidth of the service, then committed customer traffic will not be dropped. The expectation of the service provider is that the excess traffic will always be dropped before committed traffic is dropped, if at all. Note also that excess traffic is not the same as best effort traffic. For example, there may be a high priority service with excess traffic that is not within its SLS profile. Diff-Serv is another example where there are two per hop behavior (PHB) families (among others): (1) assured forwarding service (RFC 2597) and (2) best effort wherein the discard eligibility traffic is part of the assured service family.

To be able to distinguish between committed traffic and excess traffic, in the edge of metro networks, the traffic is classified and policed according to the Service Level Agreement (SLA). The traffic identified from the SLA or from the results of a traffic policing mechanism as excess traffic is marked as discard eligible while the traffic identified as committed traffic is marked as non-discard eligible. There are many methods of marking the packets as discard eligible traffic. In the case of ATM cells, the Cell Loss Priority (CLP) bit in the header of ATM cells may be used to indicate that the packet is discard eligible. In the case of Ethernet IP packets, the Differentiated Services Code Point (DSCP) bits in the IP header can be used for the discard eligible information as defined in RFC 2597. For a detailed discussion of the specifications of SLA, CIR and EIR in Metro Ethernet Networks, see MEF 1: Ethernet Services Model—Phase I and MEF 5: Traffic Management Specification—Phase 1.

To meet the committed traffic requirements in a single queue queuing system, excess traffic should always be dropped before committed traffic and if possible, committed traffic should never be dropped. Note that this is typically a requirement even if there are multiple queues (e.g., one queue per priority) or if the committed and excess traffic belong to the same service, in which case it is forbidden to place them in different queues since this would cause the misordering of packets that belong to the same service. As long as the total bandwidth of incoming traffic to a specific link is less than the available link bandwidth, all excess and committed traffic is passed. Due to the bursty nature of data traffic (e.g., file transfer, Internet, etc.), however, the total incoming bandwidth destined to a specific link may at times exceed the total available link bandwidth. It is for this reason queues are implemented to store the data traffic until such time that it can be sent over the link. Queues, however, have limited size and if a queue is in the full state incoming traffic begins to be dropped. If incoming traffic is dropped based solely on the queue full status, than whether committed or excess traffic is dropped cannot be controlled. This is because all the packets that are received when the queue is full must be dropped and specific incoming packets cannot be controlled in relation to the status of the queue.

A solution to this problem is to set a threshold 'T' in the queue and to implement the following dropping algorithm. If the level of the queue is below threshold T, then accept all traffic including both committed traffic and excess traffic. If the queue is full, drop all traffic. If the queue is not full, but above threshold T, then accept only committed traffic and drop all excess traffic.

A diagram illustrating an example queue having a threshold above which excess traffic is dropped is shown in FIG. 1. The queue, generally referenced 20, has a threshold T 26 below which both committed and excess traffic are accepted 22 and above which only committed traffic is accepted 24. The upper portion 24 of the queue should be large enough to compensate for a burst constituting the largest expectant difference between incoming committed traffic and queue output bandwidth. If the upper portion is sufficiently large, committed traffic will never be dropped. It is possible, however, that a very large burst may occur wherein some committed traffic will be dropped. This, however, can be considered as overbooking.

Considering a distributed queuing system, a problem arises when attempting to enforce the policy of precedence of committed over excess traffic. A block diagram illustrating an example prior art distributed queuing system including a plurality of core switches interconnected by network communication links is shown in FIG. 2. The example network (which can be a MAN), generally referenced 10, comprises a plurality of core switches 12 connected via communication links 18. Each core switch comprises a switching fabric 16 and one or more line cards 14. The line cards provide the transmit and receive interfaces for the network communication links on one end and provide connections to the switching fabric on the other end.

In a typical implementation of core switches such as shown in FIG. 2 there are a plurality of interface cards (or line cards) combined with one or more switch cards located inside a chassis. The switch cards are responsible for implementing the switching fabric and forwarding the traffic between the line cards. The majority of off the shelf integrated circuits (ICs) available for implementing the high speed switching fabric have no packet discard eligibility and excess traffic marking and processing capabilities. Further, the scheduling algorithm used by these integrated circuits to switch traffic of a single priority generated by multiple line cards going to the same destination line card is some variation of a round robin algorithm.

A block diagram illustrating an example prior art scheme whereby the output of several input queues is forwarded by a scheduler to an output queue is shown in FIG. 3. In this example of the scheduling scheme, a plurality of input queues 32 has data destined to the same output queue 36. In most switches, the scheduler 34 is operative to schedule the transfer of packets from the several input queues to the output queue using a round robin type algorithm.

Assuming that there is virtual output queuing (i.e. one queue per destination interface or one queue per interface card per priority) in the ingress path (i.e. traffic coming from a network link into a line card and going into the switch fabric) of each line card and that each individual queue implements the committed over excess traffic single queue algorithm, then committed traffic should never be dropped due to excess traffic coming into a line card. It cannot be guaranteed, however, that committed traffic from one line card will not be dropped due to excess traffic coming from another line card. This is the problem in a distributed queuing system.

Consider the following example to illustrate the problem. A switch chassis comprises three line cards each having 10 Gbps capacity. Two line cards attempt to send a total of 10 Gbps traffic to the third line card. The switch fabric, using a round robin algorithm, divides the 10 Gbps bandwidth of the third card evenly between the two line cards allotting each 5 Gbps. Now, if each of the line cards transmits less than 5 Gbps committed traffic, there is no problem. However, if the committed traffic comprises 7 Gbps from the first line card and only 3 Gbps from the second line card, then the destination line card will receive only 5 Gbps of committed traffic and no excess traffic from the first line card and 3 Gbps committed traffic and 2 Gbps of excess traffic from the second line card. Thus, 2 Gbps of excess traffic from the second line card was forwarded at the expense of 2 Gbps of committed traffic from the first interface card.

Note that in the general case, there may be more than a single destination per line card due to several reasons including (1) each line card may contain multiple ports, links and interfaces wherein each constitutes a separate destination, and (2) in a system supporting priorities (or any other mechanism for supporting multiple classes of service) multiple queues are required for each output port in order that packets (or frames) of different priorities can be processed differently, wherein each queue can logically be viewed as a different destination for the purposes of this invention and related disclosure.

A solution to the above problem is to use a weighted round robin algorithm in the switching fabric and to configure the weights for each line card according to the provisioned committed bandwidth coming from each line card to the destination line card. Note, however, that this solution works as long as there is no overbooking of committed traffic. Using the example illustrated above, the weight of the first line card is configured to 7 and the weight of the second line card is configured to 3. Thus, the first line card is allotted 7 Gbps out of the available 10 Gbps and the second line card is allotted 3 Gbps out of the available 10 Gbps. In each line card, the single queue algorithm described above handles the dropping of the excess traffic and prevents the committed traffic from being dropped.

Although this solution works, it has several disadvantages. Firstly, the switch fabric itself may not support weighted round robin between different input sources in which case it cannot be implemented. Secondly, the switch fabric weights must be reconfigured each time a new service is provisioned or an existing service is changed so that the weights reflect the new committed rate distribution between the line cards. Thirdly, this solution does not work if the committed traffic is oversubscribed during the provisioning stage.

An illustrative example of this third disadvantage is provided. Consider a switch chassis with three line cards, each line card having a capacity of 10 Gbps. Two line cards attempt to send a total of 10 Gbps of traffic to the third line card. We provision 9 Gbps of committed traffic from the first line card and 6 Gbps from the second line card. Note that the total traffic provisioned is 15 Gbps which is more than the 10 Gbps available.

If the fabric weights are configured according to the committed traffic distribution, the first line card will receive 60% (9/15=6 Gbps) and the second line card will receive 40% (6/15=4 Gbps). Now consider the first line card attempts to forward an actual committed bandwidth of 4 Gbps and the second line card attempts to forward an actual bandwidth of 6 Gbps. A problem arises since the first line card will forward 6 Gbps (4 Gbps committed, and 2 Gbps excess) while the second line card will forward only 4 Gbps resulting in the dropping of 2 Gbps of committed traffic.

Thus, there is a need for a mechanism for enforcing the precedence of committed over excess traffic in a distributed queuing system that overcomes the disadvantages of the prior art. The mechanism should be able to support SLA policies of committed over excess traffic without dropping committed traffic (as long as the total about of committed traffic to be forwarded in each link does not exceed the amount of bandwidth in that link).

SUMMARY OF THE INVENTION

The present invention is an apparatus for and method of enforcing precedence of committed traffic over excess traffic that overcomes the problems and disadvantages of the prior art. The mechanisms of the present invention overcome the difficulty in supporting committed over excess traffic and have particular application to distributed queuing systems. The mechanisms provide a solution for enforcing the precedence of committed over excess traffic that works even in the event of over subscription of committed traffic. The invention overcomes the limitations of the prior art solution described above and has application in systems incorporating a plurality of network devices such as switches each having multiple line cards coupled to a switch fabric.

An advantage of the mechanisms of the present invention is that they do not rely on calibration of the fast-path (e.g., scheduler round robin weights) in accordance with the provisioned services. Therefore, they do not require a fast-path configuration change for each change in the provisioning. Thus, committed services may be added, deleted or modified without requiring any change to the mechanisms of the present invention used to support enforcement of precedence of committed over excess traffic.

In order to guarantee that committed traffic is not dropped when sent from multiple sources (i.e. line cards) to a single destination, the following mechanism is employed. If the level of a queue on one of the line cards corresponding to a particular destination line card exceeds a threshold T, it begins to drop excess traffic and notifies its queue status to all other line cards via a queue control message. When a line card receives a queue control message indicating that another line card started dropping excess traffic to a specific destination, it also starts dropping excess traffic to that destination as well.

An advantage of this mechanism is that the situation is avoided whereby one line card starts dropping committed traffic while other line cards continue to forward excess traffic. This was the problem of the prior art solutions described in the Background section hereinabove. Once all the levels of the associated queues in the line cards fall back below the threshold T, all line cards stop dropping excess traffic, since this means the congestion condition has cleared.

In one embodiment, explicit messages to stop dropping excess traffic are generated and sent to other line cards. In a preferred embodiment, stop timers are used to determine when to stop dropping excess traffic. This latter method is simpler and more reliable, since if one or more of the "stop dropping" messages from even a single line card is lost or dropped, then the algorithm may get stuck in a "drop excess" state and never resume passing excess traffic.

It is important to also note that the invention is not limited by the type of network in use, the PHY layer, the type of signaling in use or by whether, provisioning is based on signaling or performed in the management plane. The invention is applicable to other networks as well.

Note also that the invention is suited for implementation in hardware such as a network processor (which may comprise a network processor chip, an FPGA, an ASIC, etc.), adapted to implement the support for committed over excess traffic mechanism of the present invention, software or a combination of hardware and software. In one embodiment, a network device comprising a processor, memory, etc. is operative to execute software adapted to perform the support for committed over excess traffic mechanism of the present invention.

There is therefore provided in accordance with the invention, a method of regulating committed traffic over excess traffic in a distributed queuing system, the method comprising the steps of monitoring a level of a queue in a line card within the system, the queue having a first destination associated therewith, upon the level exceeding a threshold, first dropping excess traffic to the first destination and sending a first drop excess traffic message to one or more other line cards within the system and upon receipt of a second drop excess traffic message sent from another line card, second dropping excess traffic associated with a second destination specified within the second drop excess traffic message.

There is also provided in accordance with the invention, an apparatus for regulating committed traffic over excess traffic in a distributed queuing system comprising a monitor adapted to monitor the level of a queue on a line card in the system, the queue having a first destination associated therewith, a message handler adapted to send and receive queue control messages to and from other line cards within the system, a controller coupled to the monitor and the message handler, the controller adapted to: if the level of the queue exceeds a threshold, drop excess traffic to the destination and send a first drop excess traffic message to one or more other line cards within the system and upon receiving a second drop excess traffic message from another line card, drop excess traffic associated with a second destination specified within the second drop excess traffic message.

There is further provided in accordance with the invention, a method of regulating committed traffic over excess traffic in a distributed queuing system, the method comprising the steps of monitoring a level of a queue in a line card within the system, the queue having a first destination associated therewith, if the level exceeds a threshold and flow control is received for the destination, first dropping excess traffic to the first destination and sending a first drop excess traffic message to all other line cards within the system and upon receipt of a second drop excess traffic message sent from another line card, second dropping excess traffic associated with a second destination specified within the second drop excess traffic message.

There is also provided in accordance with the invention, an apparatus for regulating committed traffic over excess traffic in a distributed queuing system comprising first means for monitoring a level of a queue in a line card within the system, the queue having a first destination associated therewith, second means for dropping excess traffic to the first destination and sending a first drop excess traffic message to all other line cards within the system if the level exceeds a threshold and flow control is received for the destination and third means for dropping excess traffic associated with a second destination specified within the second drop excess traffic message upon receipt of a second drop excess traffic message sent from another line card.

There is further provided in accordance with the invention, a provider switch comprising a plurality of line cards incorporating one or more ports for interfacing the provider switch to one or more communication links, each line card comprising a plurality of ports, each port coupled to a communication link, a packet processing engine coupled to the plurality of ports, the packet processing engine for determining forwarding decision and destination queue for each ingress packet, a queue manager coupled to the packet processing engine, the queue manager comprising first means for monitoring a level of a queue in a line card within the system, the queue having a first destination associated therewith, second means for dropping excess traffic to the first destination and sending a first drop excess traffic message to one or more other line cards within the system if the level exceeds a threshold and flow control is received for the destination, third means for dropping excess traffic associated with a second destination specified within the second drop excess traffic message upon receipt of a second drop excess traffic message sent from another line card and switching means coupled to the queue manager and adapted to provide switching fabric functionality of the provider switch.

There is also provided in accordance with the invention, a method of regulating committed traffic over excess traffic in a distributed queuing system, the method comprising the steps of monitoring a level of a queue within the system, the queue having a first destination associated therewith, upon the level exceeding a first threshold, first dropping excess traffic to the first destination, upon the level exceeding a second threshold, sending a first drop excess traffic indication to one or more other queues within the system and upon receipt of a second drop excess traffic indication sent from another queue, second dropping excess traffic associated with a second destination specified within the second drop excess traffic indication.

There is further provided in accordance with the invention, a method of regulating committed traffic over excess traffic in a distributed queuing system wherein packets have a plurality of discard eligibility levels, the method comprising the steps of monitoring a level of a queue within the system, the queue having a first destination associated therewith, first determining to drop excess traffic to the first destination in accordance with a first dropping function, second determining to send a first drop excess traffic indication to one or more other queues within the system and upon receipt of a second drop excess traffic indication sent from another queue, dropping excess traffic associated with the first destination with a second drop excess traffic indication.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
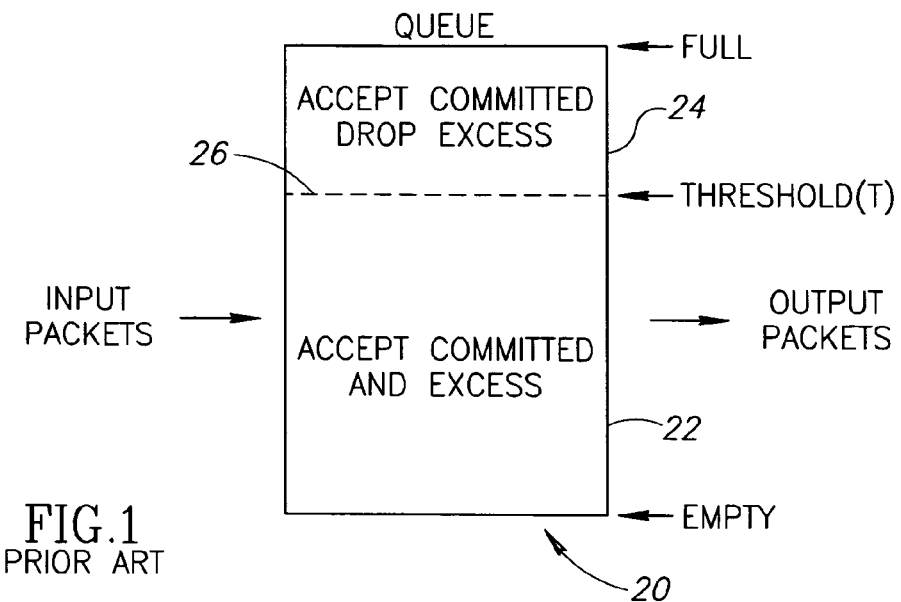
FIG. 1 is a diagram illustrating an example queue having a threshold above which excess traffic is dropped.
Figure 3:
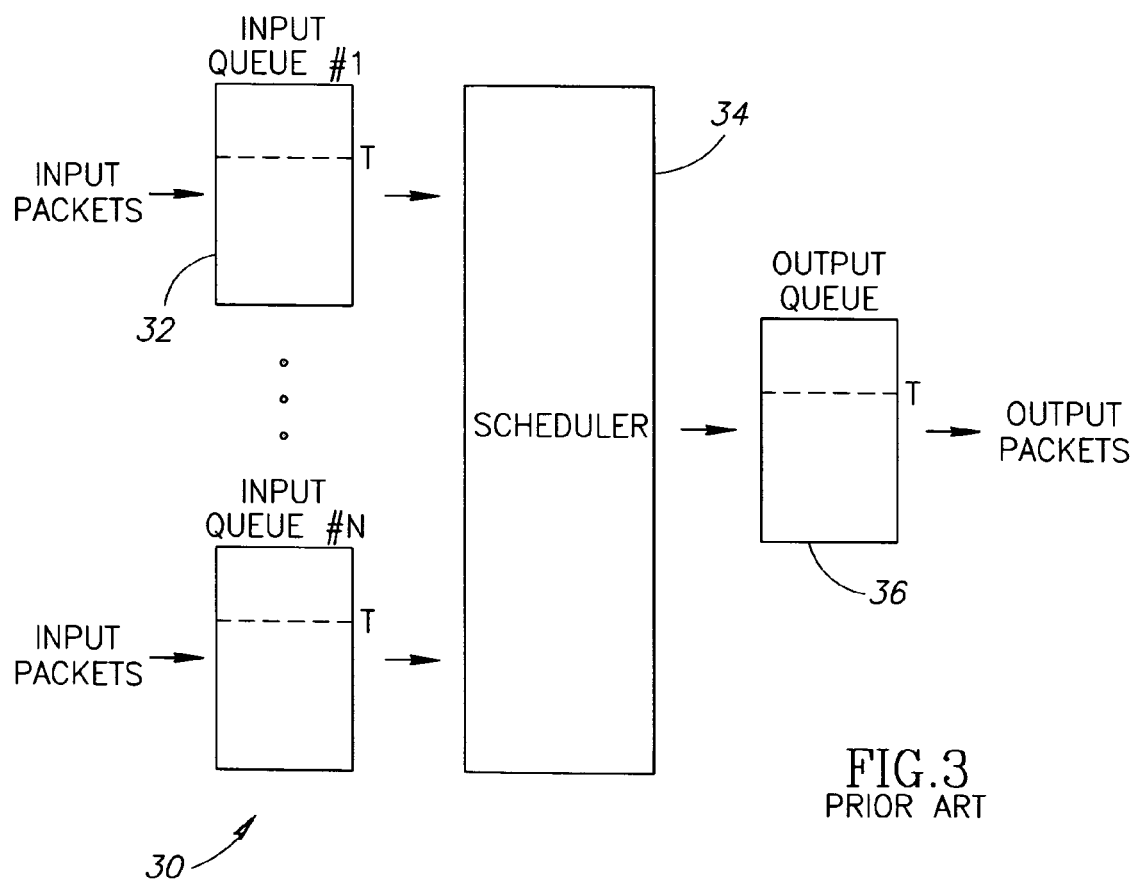
FIG. 3 is a block diagram illustrating an example prior art scheme whereby the output of several input queues is forwarded by a scheduler to an output queue.
Figure 2:
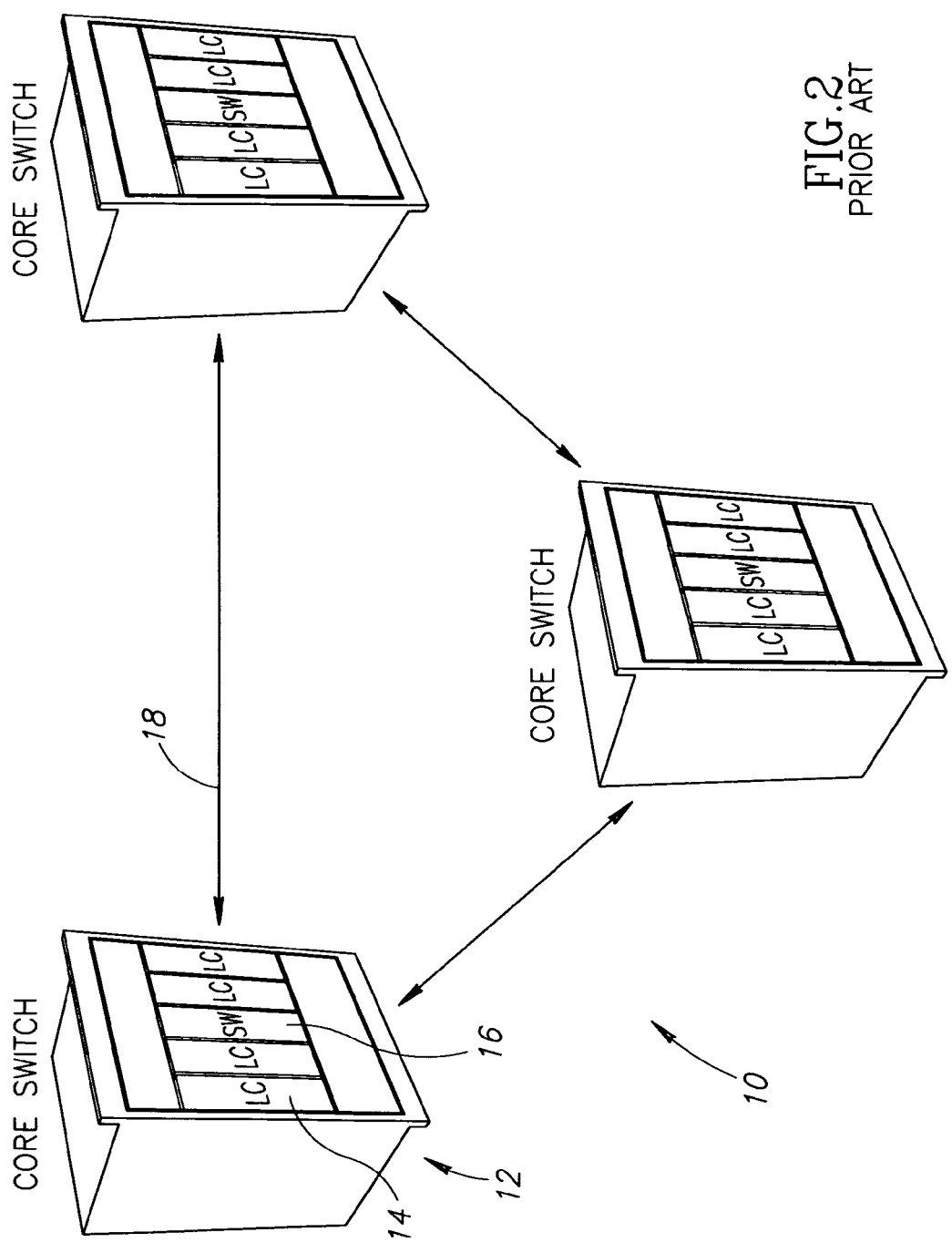
FIG. 2 is a block diagram illustrating an example prior art distributed queuing system including a plurality of core switches interconnected by network communication links.

The following notation is used throughout this document.

| Term | Definition |
| --- | --- |
| ASIC | Application Specific Integrated Circuit |
| ATM | Asynchronous Transfer Mode |
| CD-ROM | Compact Disc-Read Only Memory |
| CIR | Committed Information Rate |
| CLP | Cell Loss Priority |
| CPU | Central Processing Unit |
| CSIX | Common Switch Interface |
| DAT | Digital Audio Tape |
| DSCP | Differentiated Services Code Point |
| DSL | Digital Subscriber Line |
| DSP | Digital Signal Processor |
| DVD | Digital Versatile Disk |
| EEPROM | Electrically Erasable Programmable Read Only Memory |
| EIR | Excess Information Rate |
| EPROM | Erasable Programmable Read Only Memory |
| FDDI | Fiber Distributed Data Interface |
| FE | Fast Ethernet |
| FPGA | Field Programmable Gate Array |
| GE | Gigabit Ethernet |
| IC | Integrated Circuit |
| IEEE | Institute of Electrical and Electronic Engineers |
| IP | Internet Protocol |
| ISP | Internet Service Provider |
| LAN | Local Area Network |
| LSR | Label Switched Router |
| MAC | Media Access Control |
| MAN | Metropolitan Area Network |
| MEN | Metro Ethernet Network |
| MPLS | Multi-Protocol Label Switching |
| NIC | Network Interface Card |
| NMS | Network Management System |
| PC | Personal Computer |
| PDH | Plesiochronous Digital Hierarchy |
| PDU | Protocol Data Unit |

-continued

| Term | Definition |
| --- | --- |
| PHB | Per Hop Behavior |
| PPE | Packet Processing Engine |
| QoS | Quality of Service |
| RAM | Random Access Memory |
| RFC | Request for Comment |
| ROM | Read Only Memory |
| RPR | Resilient Packet Ring |
| SDH | Synchronous Digital Hierarchy |
| SLA | Service Level Agreement |
| SLS | Service Level Specification |
| SONET | Synchronous Optical Network |
| TDM | Time Division Multiplexing |
| UNI | User to Network Interface |
| VLAN | Virtual Local Area Network |
| WAN | Wide Area Network. |

DETAILED DESCRIPTION OF THE INVENTION

The present invention is an apparatus for and method of enforcing precedence of committed traffic over excess traffic that overcomes the problems of the prior art. The mechanisms of the present invention overcome the difficulty in supporting committed over excess traffic and have particular application to distributed queuing systems. The mechanisms provide a solution for enforcing the precedence of committed over excess traffic that is operative even in the event of over subscription of committed traffic. The invention overcomes the limitations of the prior-art solutions described above and has application in systems incorporating a plurality of network devices such as switches wherein one or more of the switches have multiple line cards coupled to a switch fabric.

An example embodiment is provided to illustrate the mechanism for enforcing the precedence of committed over excess traffic of the present invention. It is not intended, however, that the invention be limited to the configurations and embodiments described herein. It is appreciated that one skilled in the networking, electrical and/or software arts may apply the principles of the present invention to numerous other types of networking devices and network configurations as well, including other types of synchronous data streams and asynchronous transport networks without departing from the spirit and scope of the invention.

In particular, the invention is not limited to the use of a single type of network, e.g., Ethernet, ATM, etc. based networks. The invention is applicable in networks adapted to switch any type of Protocol Data Unit (PDU) such as packets, cells, frames, etc. The invention is applicable to any distributed queuing system having multiple classes of service (e.g., expedited, assured, committed, excess, best effort, etc.) The invention requires the ability to monitor queue levels, to control the traffic ingress to the queue and to generate and send queue control messages to other line cards and network devices (e.g., switches) in the queuing system. Both the problem of supporting committed over excess traffic and the below described solution are relevant for many applications and can be generalized to distributed queuing systems having a dumb scheduler between the source queues and the output link or destination.

Throughout this document, the term line card is defined as the interface card used to transmit packets, frames, cells, etc. received from a switch fabric over one or more network communication links and to forward packets, frames, cells, etc. received over one or more network communication links to the switch fabric. Line cards are also referred to as interface cards and are meant to be used synonymously. A distributed queuing system is defined as a system incorporating multiple queues outputting data to the same destination that are not necessarily situated in the same location (either on different line cards, different components or within different processing blocks within the same component). Typically, the queues are within the same chassis on multiple line cards, wherein each line card is queuing to the same destination line card.

In accordance with the present invention, in order to guarantee that committed traffic is not dropped when sent from multiple sources (i.e. line cards) to a single destination, the following mechanism is employed. If the level of a queue on one of the line cards corresponding to a particular destination line card exceeds a threshold T, it begins to drop excess traffic and notifies its queue status to all other line cards via queue control messages that are sent through the switch fabric or via other means. When a line card receives a queue control message that another line card started dropping excess traffic to a specific destination, it also starts dropping excess traffic to that destination as well.

Note that if the switch fabric itself is used to convey the queue control messages, the fabric must support prioritization, and these messages are preferably sent using a higher (i.e. expedited) priority. Otherwise, the queues that the messages are supposed to protect will cause them arrive too late.

Figure 4:
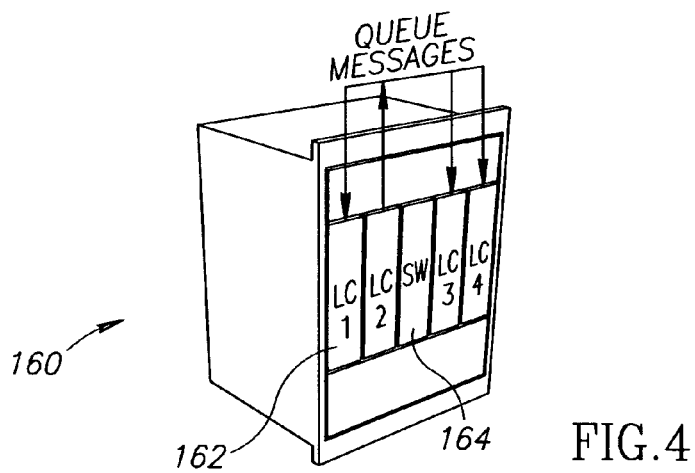
FIG. 4 is a diagram illustrating the transmission of queue control messages from one line card to other line cards in a network switch in accordance with the present invention.

A diagram illustrating the transmission of queue control messages from one line card to other line cards in a network switch in accordance with the present invention is shown in FIG. 4. The switch, generally referenced 160, comprises a switch fabric (switch card 164) and a plurality of line cards (i.e. interface cards) 162. The line cards are coupled via a chassis backplane or other means to the switch fabric and to one or more network communication links (not shown).

To illustrate, assume line card 2 detects that the level of one of its queues associated with a particular destination has exceeded a predetermined threshold T. In response, it begins to drop excess traffic and generates and sends a 'drop excess traffic' queue control message to the other line cards in the switch, i.e. line cards 1, 3 and 4. Depending on the implementation of the switch, the messages may pass through the switch fabric 164 or via some other mechanism. The actual manner of transmitting queue control messages to other line cards and other network devices is not critical to the invention, as long as it is fast enough (e.g., cannot use the fabric in the same priority).

Depending on the implementation, the queue control messages pass through the switch fabric to the line cards using the standard CSIX interface or OIF-SPI.4.

An advantage of this mechanism is that the situation is avoided whereby one line card starts dropping committed traffic while other line cards continue to forward excess traffic. This was the problem of the prior art solutions described in the Background section hereinabove. Once all the levels of the associated queues in the line cards fall back below the threshold T, all line cards stop dropping excess traffic.

Another advantage of the mechanism of the present invention is that it may be implemented in network devices without requiring a configuration change for each change in provisioning. Thus, committed services may be added, deleted or modified without requiring any change to the mechanisms of the present invention used to support enforcement of precedence of committed over excess traffic.

In one embodiment, explicit messages to stop dropping excess traffic are generated and sent to other line cards. In a preferred embodiment, stop timers are used to determine when to stop dropping excess traffic. This latter method is simpler and more reliable, since if one or more of the "stop dropping" messages from even a single line card is lost or dropped, then the algorithm may get stuck in a "drop excess" state and never resume passing excess traffic.

Note that it is assumed that the network employed has the capability to distinguish between different classes of traffic (i.e. committed versus excess). In the case of metro networks (MANs), the edge switches are typically capable of classifying and policing traffic according to the SLA. Traffic identified as excess traffic is marked as discard eligible and traffic identified as committed traffic is marked as non-discard eligible.

One possible method of marking packets with discard eligible information is to use the 802.1p field in the 802.1Q Virtual Local Area Network (VLAN) tag. This enables all protocols to be marked including non-IP protocols. The Institute of Electrical and Electronic Engineers (IEEE) 802.1 Provider Bridge working group is likely to standardize this manner of marking discard-eligibility. An additional method of marking packets with discard eligible information uses Assured Forwarding, a Differentiated Services (DS) Per-Hop-Behavior (PHB) Group, described in RFC 2597.

Figure 5:
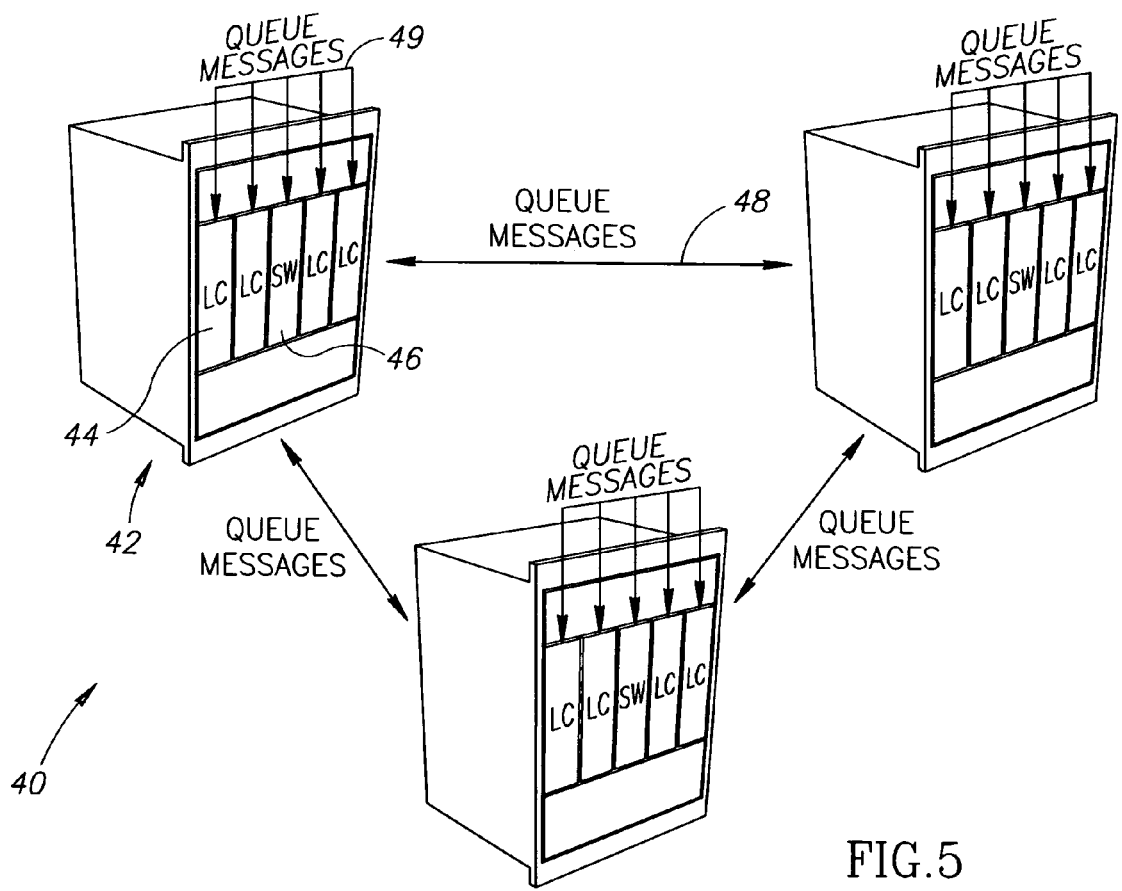
FIG. 5 is a block diagram illustrating the transmission of queue control messages between the line cards within a switch and between switches in accordance with the present invention.

A block diagram illustrating the transmission of queue control messages between the line cards within a switch and between switches in accordance with the present invention is shown in FIG. 5. The example distributed queuing system, generally referenced 40, comprises a plurality of network devices (e.g., switches) 42 connected by network communication links 48. Each switch comprises a switch fabric 46 and a plurality of line cards 44.

In accordance with the invention, queue control messages generated by any one of the line cards is forwarded to all the other line cards in the queuing system, including the other line cards in the same switch line cards in other switches as well. The queue control messages may be forwarded using any suitable mechanism and is not critical. The delay between the detection of the level of a queue exceeding the threshold and the reception of the queue control message by all other lines cards, however, is critical and preferably should be as short as possible.

Figure 6:
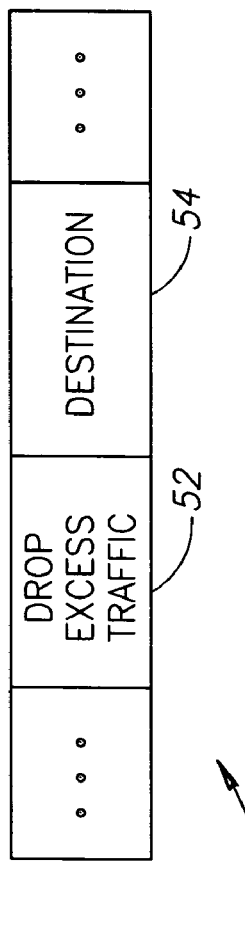
FIG. 6 is a diagram illustrating the format of a drop excess traffic message of the present invention.

A diagram illustrating the format of a drop excess traffic message of the present invention is shown in FIG. 6. The example format of the drop excess traffic message, generally referenced 50, comprises a field 52 adapted to indicate that the recipient queue should start dropping excess traffic and a field 54 indicating the particular destination. Although the 'stop excess traffic' message generated by a queue does not require a specific format, sufficient information must be conveyed for the recipient switch to determine the particular queue associated with the indicated destination that is to drop excess traffic.

In a preferred embodiment, the mechanism is improved by only sending the drop excess traffic message for a specific destination when (1) the level of a queue leading to that destination exceeds a threshold and (2) the destination is receiving flow control from the switch fabric. In a typical switch, backpressure signals generated by the switch fabric are used to provide flow control to the source queues. It is preferable to send the drop excess traffic messages only when there is actual congestion on the specific output (i.e. destination). In a typical switch, the level of the queue may exceed the threshold for other reasons not related to flow control and not related to the problem of enforcing precedence of committed over excess traffic. Examples of other reasons that would cause the queue level to exceed the threshold include (1) over subscription on provisioning, (2) a higher traffic load to another destination or (3) all the queues between all destinations use shared memory and one of the queues is reaching full level with traffic to a different destination.

Sending drop traffic message based only on the queue level without consideration of flow control, would most likely guarantee transmission of the committed traffic but would affect excess traffic in the opposite direction. It would cause a reduction in the EIR traffic because if excess traffic is dropped on other line cards where there is no congestion (i.e. no flow control), the EIR traffic is effectively reduced.

Thus, it is preferable to drop EIR traffic only when the queue exceeds the threshold and flow control is received on the destination. Further, if backpressure on a destination is received, the line card does not automatically begin dropping excess traffic. Rather, the line card waits for the queue level to exceed a certain threshold T.

Figure 7:
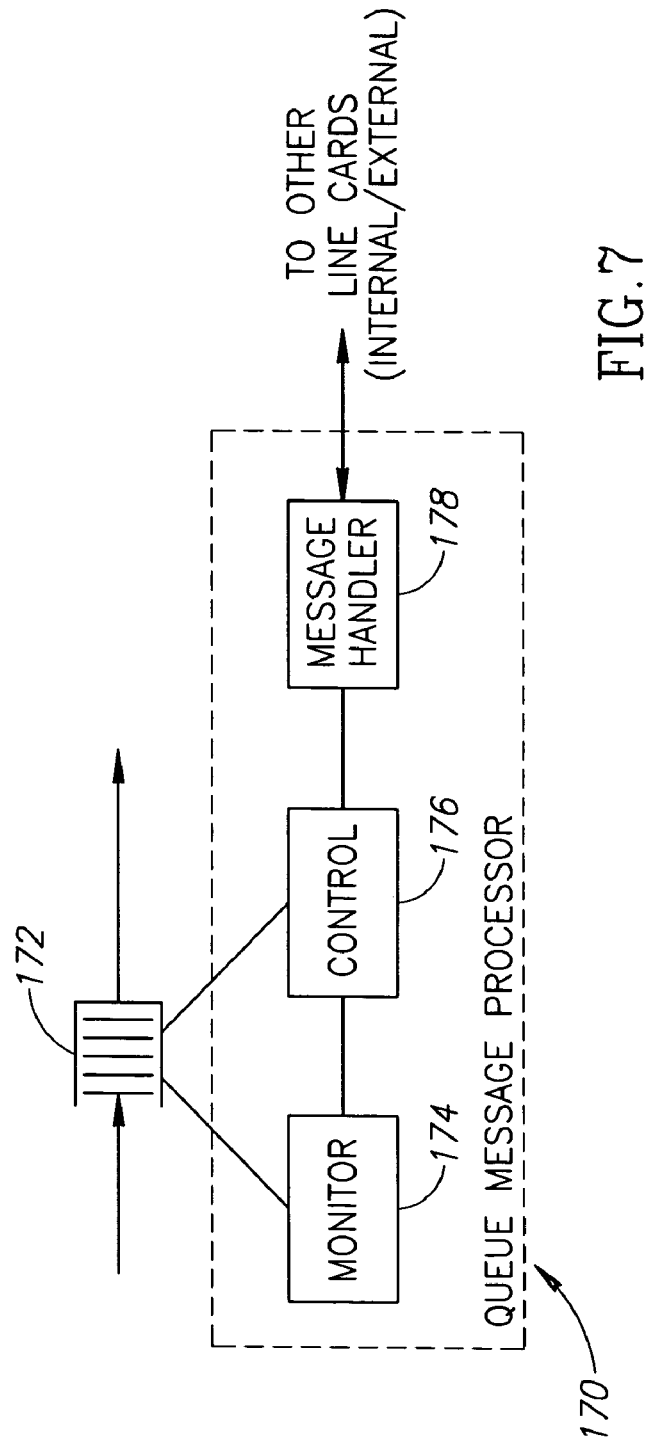
FIG. 7 is a block diagram illustrating an example embodiment of the queue control message processor of the present invention.

A block diagram illustrating an example embodiment of the queue control message processor of the present invention is shown in FIG. 7. The queue control message processor, generally referenced 170, comprises a monitor unit 174, control unit 176 and message handler 178. Each queue (or alternatively each line card) in the distributed queuing system has a queue control message processor associated therewith. The monitor 174 in the queue control message processor functions to monitor the level of a queue 172 and reports this level to the controller 176. The queue is associated with the particular destination which may be on the same line card, different line card in the same switch or line card in a different switch. When the controller detects that the level of the queue has exceeded a threshold, it instructs the queue to begin dropping excess traffic. It also instructs the message handler to generate and send a queue control message to all the other line cards indicating that queues associated with the destination should start dropping excess traffic.

Figure 8:
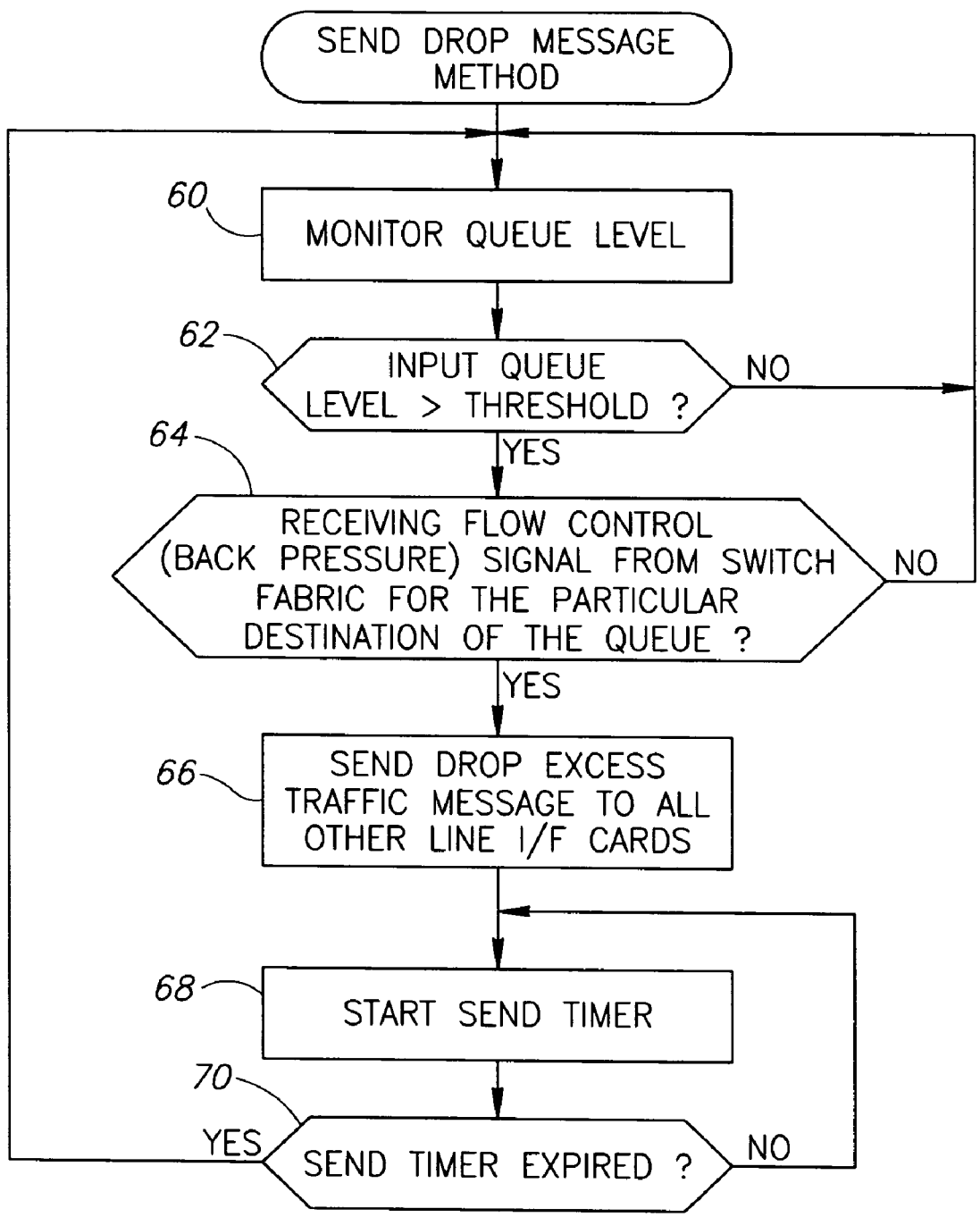
FIG. 8 is a flow diagram illustrating the drop excess traffic message method of the present invention.

To illustrate the method of sending the drop excess traffic message to other line cards, a flow diagram and corresponding state diagram are presented hereinbelow. A flow diagram illustrating the drop excess traffic message method of the present invention is shown in FIG. 8. The level of the each queue is monitored (step 60) and if the level exceeds threshold T (step 62), it is then checked if flow control (i.e. backpressure signal) is received from the switch fabric for the particular destination (step 64). If the queue level does not exceed the threshold or no flow control is received, then the method returns to step 60.

If both conditions are met (steps 62, 64) then excess traffic is dropped and a drop excess traffic message is sent to all other line cards (step 66). A send timer is started (step 68) and upon expiration (step 70), the method returns to step 60.

Figure 9:
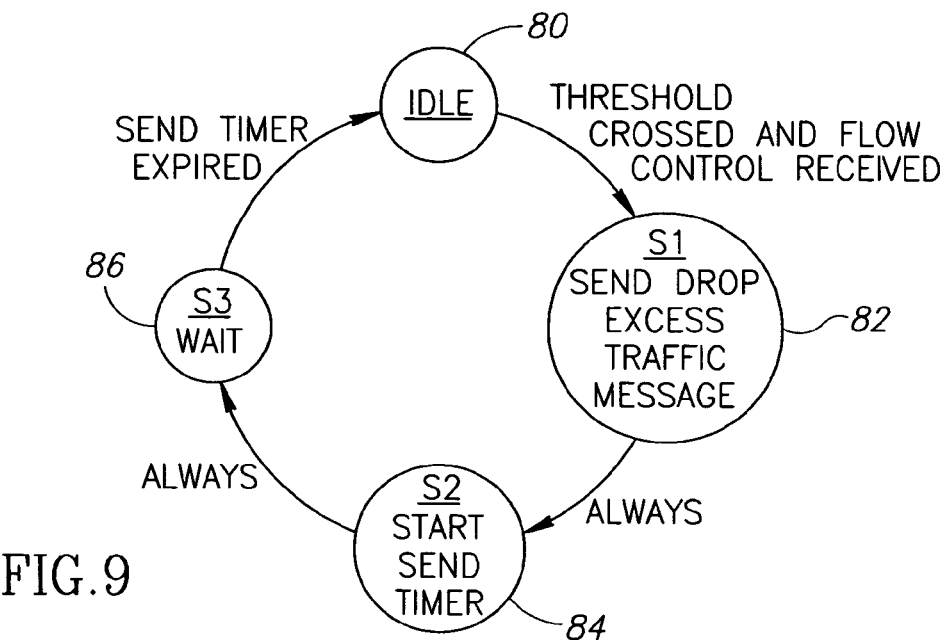
FIG. 9 is a state diagram illustrating the send drop excess traffic message state machine of the present invention.

A state diagram illustrating the send drop excess traffic message state machine of the present invention is shown in FIG. 9. Note that both the flow diagram of FIG. 8 and the state machine of FIG. 9 are intended to be implemented in each line card. The state machine is responsible for detecting queue levels, starting to drop excess traffic and sending a drop excess traffic message to all other line cards thus indicating a problem exists in one of the queues. The state machine is preferably implemented per destination. Note that a destination may be any suitable entity, for example, a destination port, a specific priority in a specific destination port, etc. Note also, that a single line card may include a number of queues associated with the same destination and priority (e.g., each queue handles traffic from a different ingress port or group of ingress-ports) wherein the flow diagram of FIG. 8 and state machine of FIG. 9 are performed for each queue. Thus, the same line card contains a plurality of instances of the combination of flow diagram and state machine for the same destination.

The Idle state 80 is the initial state and once (1) excess traffic begins to be dropped to a specific destination due to a local problem (caused by local queues exceeding the threshold T) and (2) flow control is received on the destination, state S1 82 is entered. In this state, a queue control message is sent to all line cards indicating to each the problem on the specific destination. Once a line card receives this message it will begin dropping all excess traffic directed to this destination (described in more detail in the receive drop message state machine hereinbelow). The delay between the occurrence of the problem and the message received by all the line cards should preferably be minimized. This can be achieved by sending these messages with a different priority (assuming the same fabric is used for these messages). For example, an expedited priority can be used for the queue control messages. In order not to drop committed traffic, the portion of the queue above the threshold T (FIG. 1) is used as a buffer. Therefore, the delay is preferably relative to the size of the upper portion of the queue and the committed burst rate.

Note that the condition for starting to drop EIR traffic is not necessarily the same the condition for sending the queue control message. In an alternative embodiment, both conditions are different. For example, two different thresholds are used, one for starting to drop EIR traffic and one for sending the queue control message telling others to do so. The benefit of such behavior is that in some applications it is preferable to try to solve the congestion problem locally before involving the entire network/chassis.

After the queue control message is sent to all line cards, the machine moves to state S2 84. In state S2, a send timer is started. This timer is used to prevent the perpetual sending of messages to the line cards. After sending a drop excess traffic message, the send timer must expire before sending a second drop excess traffic message.

After starting the send timer, state S3 86 is entered. In state S3, we wait for the send timer to expire. Once the send timer expires, the machine moves back to the Idle state 80. If the problem still exists or occurs again, the machine moves to state S1 and the process repeats.

Figure 10:
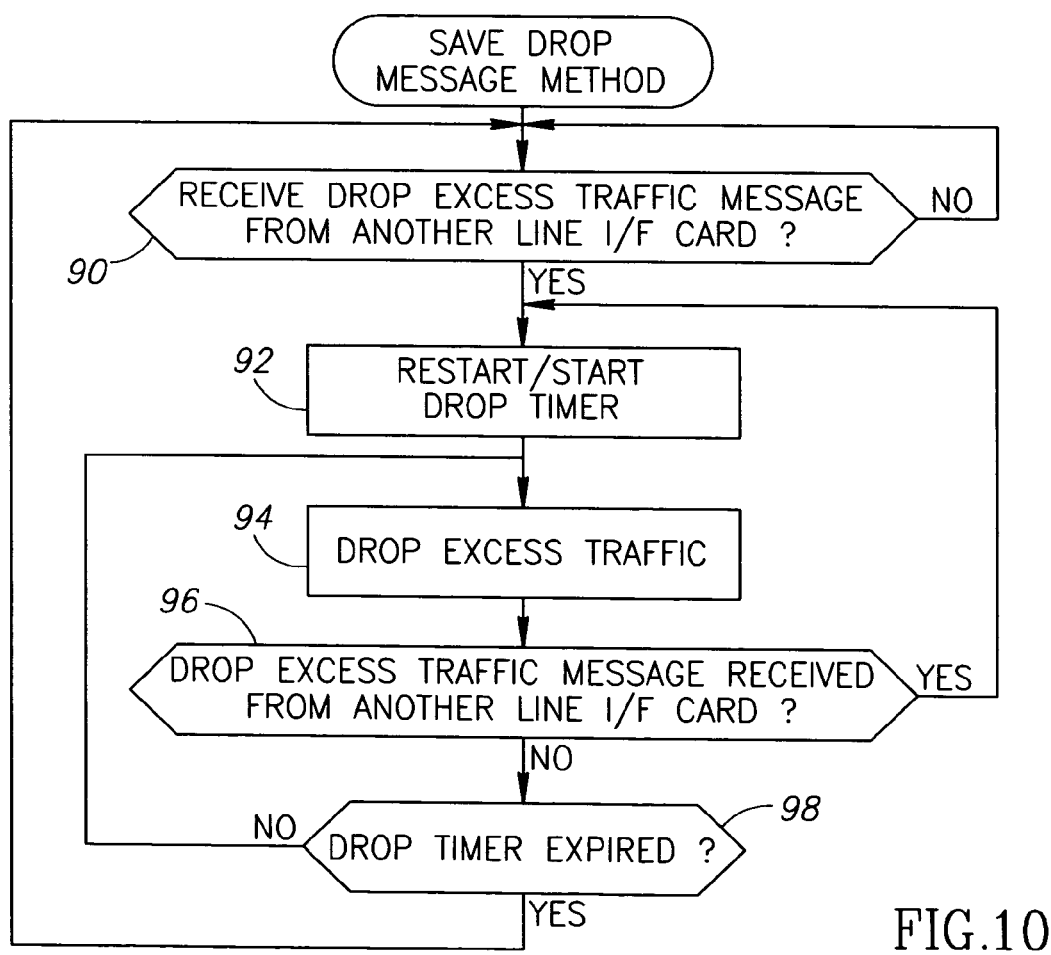
FIG. 10 is a flow diagram illustrating the receive drop excess traffic message method of the present invention.

To illustrate the method of receiving the drop excess traffic message from other line cards, a flow diagram and corresponding state diagram are presented hereinbelow. A flow diagram illustrating the receive drop excess traffic message method of the present invention is shown in FIG. 10. When a drop excess traffic message is received from another line card (step 90), a drop timer is started (or restarted) (step 92). The corresponding queue begins dropping excess traffic (step 94). If another drop excess traffic message is received from another line card while the stop timer has not expired (step 96), the stop timer is restarted (step 92). Once no other messages are received and the stop timer expires (step 98), the method returns to step 90.

Figure 11:
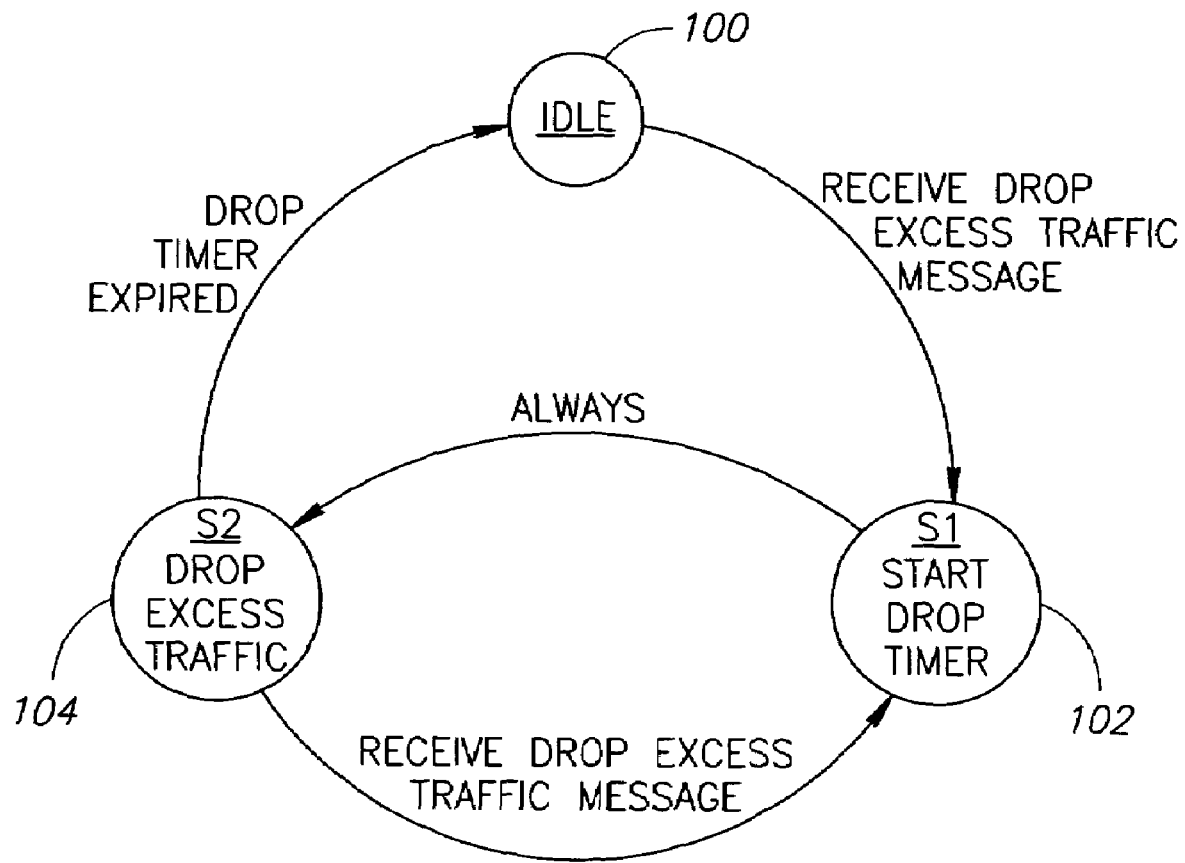
FIG. 11 is a state diagram illustrating the receive drop excess traffic message state machine of the present invention.

A state diagram illustrating the receive drop excess traffic message state machine of the present invention is shown in FIG. 11. Both the flow diagram of FIG. 10 and the state machine of FIG. 11 are intended to be implemented in each line card. The receive state machine functions to handle the reception of the drop excess traffic messages from all line cards and to start and stop dropping local excess traffic in response to these messages. Note that this state machine is preferably implemented per destination.

It is important to note that if the local line card queue is already above the threshold T, excess traffic is dropped regardless of whether any drop excess traffic messages are received. The state machine begins in the Idle state 100 where excess traffic is dropped only in the event of a local queue problem. Upon receipt of a drop excess traffic message from another line card to the specific destination, state S1 102 is entered. In state S1 the drop timer is started which is used to prevent forever dropping excess traffic to the destination. Note that preferably, rather than send queue control messages to stop dropping excess traffic, the present invention uses stop timers to determine when to stop dropping excess traffic.

After starting the drop timer, state S2 104 is entered. While in state S2, if another drop excess traffic message is received to the same destination, we return to state S1 and restart the drop timer. Once the stop timer expires, we return to the Idle state 100 and the process repeats anew.

The duration of both the send and drop timers can be determined by trial or error. Preferably, the duration of the send timer is set to drop excess traffic for a sufficient time to empty the queues on the other line cards because if the switch fabric continues to receive traffic from line cards it will continue to distribute traffic evenly to all the line cards and an oscillation. Thus the send timer duration should be long enough for the queue level to drop from the threshold level to empty. If the send timer duration is set too long, the queue will fill up and not be able to handle the committed information rate (CIR).

The drop timer duration should not be set too long otherwise more excess traffic than necessary will be dropped. Preferably, the send and drop timers are adapted to be configurable and set by trial and error within a specific range of values. Generally, the timer duration is configured to be relative to the size of the queue and the rate the queue is emptied. The emptying rate typically depends on the number of line cards competing for the destination, which is dynamic and always changing.

Further, the send timer and drop timer must be rationally related to each other. If the send timer is set too long relative to the drop timer, the queues will become full because the other line cards have already ceased dropping excess traffic since their drop timers expired and an oscillation of 'breathing' may occur. Thus the drop timer duration is preferably related to the size and emptying rate of the queue between the empty and threshold levels. The send timer duration is preferably related to the size and fill rate of the queue between the threshold and full levels. In one embodiment, the stop time duration is determined first and the duration of the send timer is set equal to the drop timer duration (with an optional constant decremented).

The discussion above assumed EIR and CIR traffic having a single discard eligibility level. The discard eligibility level is used to distinguish CIR from EIR traffic. This, however, is only one possible congestion management scheme. It will be appreciated by one skilled in the art that it is not intended that the present invention be limited to the particular congestion management scheme presented herein. Other congestion management schemes may be used with the present invention without departing from its scope. Alternative embodiments include implementing a Random Early Discard (RED), a weighted RED or other more sophisticated congestion management schemes, in which a plurality of different thresholds are defined, each corresponding to a different behavior (e.g., discard probability) for the committed and excess traffic. Thus, the invention may employ any number of discard eligibility levels (e.g., there are a number different priorities using the Diff-Serv assured forwarding service, each having three levels of discard eligibility).

Further, any suitable dropping function may be used with the invention. In an alternative embodiment, packets are not simply either discarded or not discarded, but rather a gradual slow down is made to packet transmission as is done in schemes using random early discard (RED) or weighted RED techniques. The different levels of random early discard may be triggered according one or more criteria, for example, in accordance with a combination of the discard eligibility marking and the threshold.

As described above, different thresholds may be defined whereby one threshold is used for locally dropping excess traffic and a different threshold is used to trigger the sending of the queue control message. In this embodiment, the network first attempts to solve the congestion problem locally before alerting and disturbing other entities in the chassis.

It is also intended that the invention not be limited to implementation in line cards only. The invention is operative regardless of whether the queues are located in line cards or in other types of platforms. For example, the queues may be located in a network device that comprises a plurality of queues with zero or more line cards.

It is further intended that the invention not be limited to the manner in which the queue control messages are conveyed from one entity to another or in the manner the information itself is conveyed to other queues. In an alternative embodiment, if the level of one queue rises above the threshold, the other queues may be notified of this status without the transmission of a queue control message. Instead, the information on the status of the queue is conveyed by other means such as (1) a central CPU adapted to monitor each queue (i.e. using a polling scheme) and to configure the queues accordingly or (2) a hardware signal line shared amongst the queues.

Provider Switch Embodiment

A network device can be adapted to incorporate the queue control message processing mechanism of the present invention. Hardware means and/or software means adapted to execute the mechanism may be incorporated, for example, within the line cards of a network device such as a core switch, access switch, provider switch, enterprise switch, Network Management System, Label Switching Router (LSR), Ethernet LAN switch, network switch or any other wired or wireless network device. The network device may be constructed using any combination of hardware and/or software. A provider switch is defined as any switch used by a service provider. Examples of provider switches include edge switches, core switches and access switches. An enterprise switch is defined as any switch used within an enterprise, such as the switches used within a corporation, college campus, etc.

Figure 12:
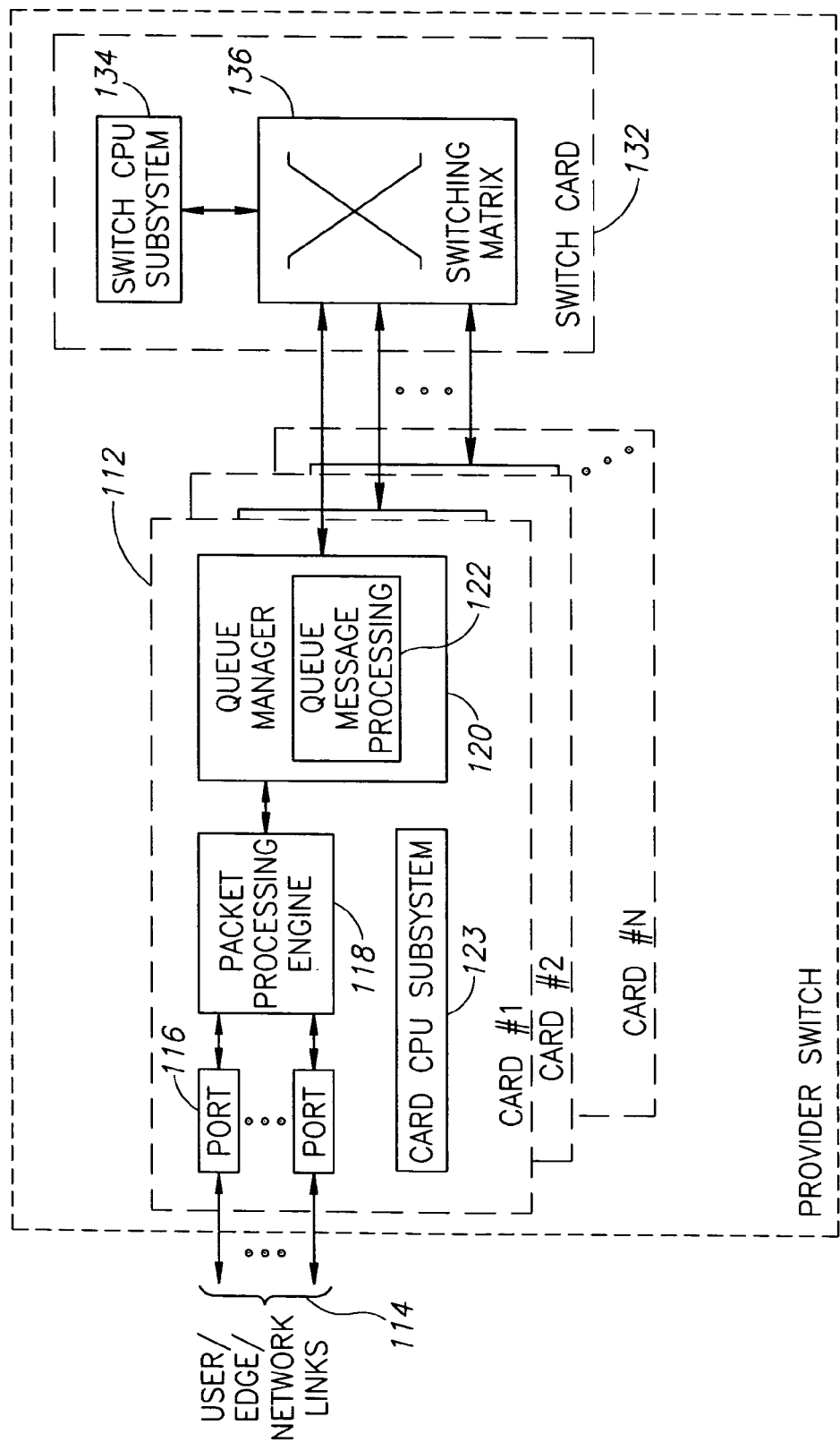
FIG. 12 is a block diagram illustrating an example provider switch incorporating the queue control message processing of the present invention.
Figure 13:
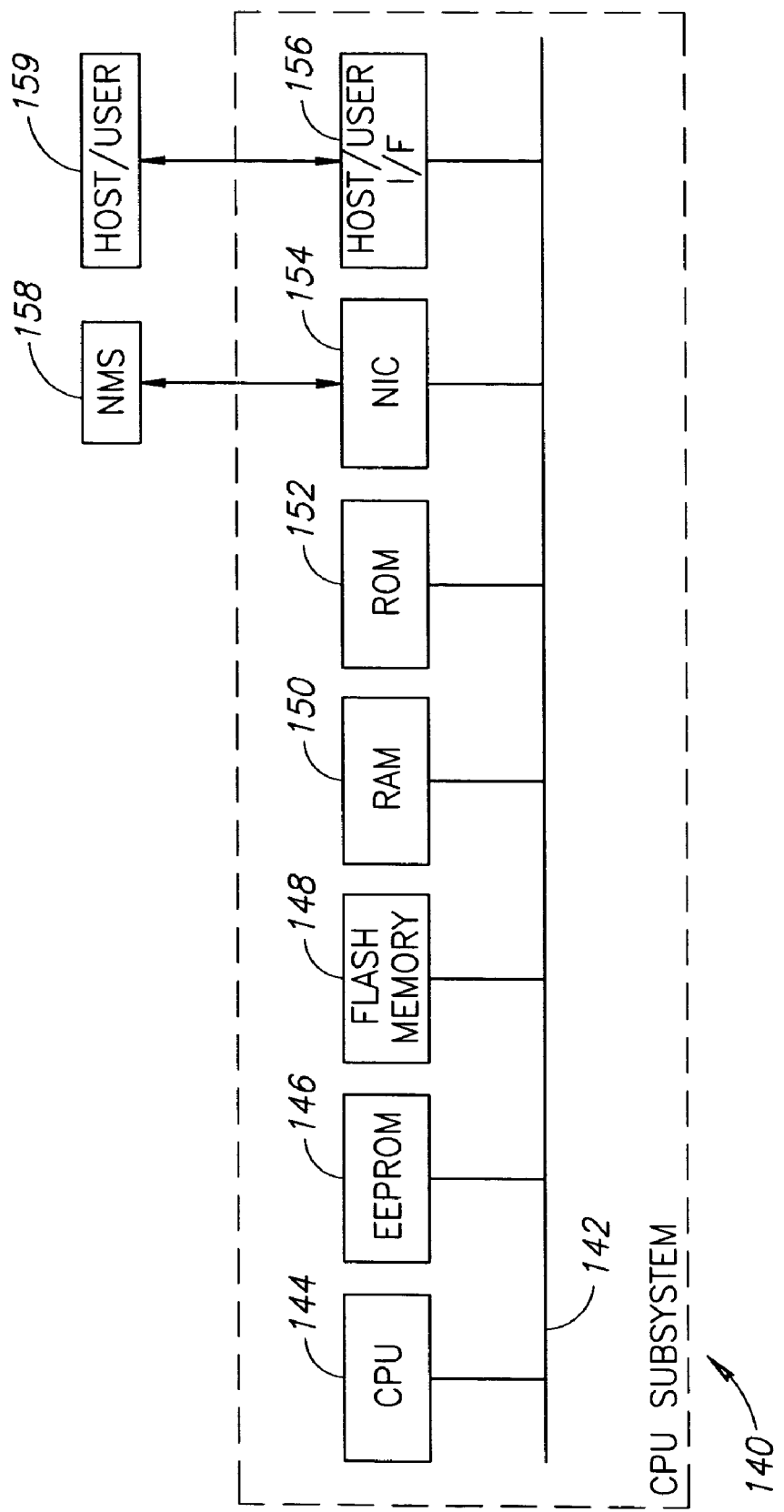
FIG. 13 is a block diagram illustrating the CPU subsystems of the provider switch of FIG. 12 in more detail.

As an example, the invention is applied to a provider switch. A block diagram of a provider switch (either edge, core or access switch) incorporating the queue control message processing mechanism of the present invention is shown in FIG. 12. A block diagram illustrating the CPU subsystems of the provider switch of FIG. 12 in more detail is shown in FIG. 13. With reference to FIGS. 12 and 13, the provider switch, generally referenced 110, is modularly constructed and comprises a plurality of line interface cards 112, labeled card #1 through card #N, and one or more switch cards 132. The line cards function to provide an interface to communication links 114. The communication links may connect the provider switch to users, edge devices or network links. The switch card provides a switching function whereby packets are transferred between line cards (or between ports).

The communication links are terminated at the line cards via the plurality of ports 116. Regardless of what type of links they are connected to, the ports function to provide the PHY interface to the bidirectional communication links. The line interface cards may be adapted to interface to any particular type of link including, for example, any variety of copper or optical based Ethernet, Token Ring, FDDI, SONET/SDH, ATM, RPR. In addition, a line card may have a plurality of ports each adapted to communicate over a different type of link. For connecting to a user or edge device, the port is adapted to connect directly or indirectly through access/aggregation devices to a plurality of users or customer/client edge devices via communication links 114. The client edge ports of the provider switch interface to the user or client edge device via any suitable type of interface, e.g., Gigabit Ethernet (GE), Fast Ethernet (FE), PDH interface (e.g., T1/E1), etc. Similarly, if the port connects to a network link, the port functions to interface the line card to other provider switches (i.e. edge or core switches) via any suitable interface such as Optical Ethernet (e.g., 1 GE, 10 GE, etc.), TDM, RPR, etc.

Data received over the links by the ports is forwarded to the packet processing engine (PPE) 118. The packet processing engine performs packet processing on the packets received from the ports. Some of the key functions performed by the packet processing engine include determining the discard eligibility of each packet, calculating a forwarding decision for each packet, determining which queue to forward the packet to and making any necessary changes to a packet.

The packet processing engine comprises both an ingress packet processor (not shown) and an egress packet processor (not shown). The packet processing engine typically also comprises timestamp circuits, clock circuits, memory, counters and CPU interface, means for performing OA&M protocols processing (part of this capability may reside in the CPU as well). The packet processing engine may be implemented as a microcontroller, microprocessor, microcomputer, ASIC core, FPGA core, network processor, central processing unit (CPU) or digital signal processor (DSP) or any other suitable computing means. Once processing is complete, the packet processing engine passes packets to the queue manager 122 which functions to place the packet in the appropriate ingress queue.

The queue manager 120 functions to manage the various queues within the line card. A plurality of queues are typically used wherein separate queues are provided for different priorities, destinations, etc. In accordance with the invention, each line card comprises a queue control message processing module adapted to provide support for committed over excess traffic as described hereinabove. Note that the invention is not limited to any particular line interface type or link speed. In addition, the invention is not limited to any particular number of communication links or ports, as any number of links and ports of each type may be used. Further, the line interface cards may be adapted to interface to any type of communication links such as any variety of copper or optical based Ethernet, Token Ring, FDDI, SONET/SDH, PDH, ATM, RPR, etc. Note that the queue management system is typically constructed in hardware in order to provide a high bandwidth fast path for data that is capable of keeping up with the line rates of the communication links.

Note that the specific implementation of the line card is not critical to the invention. For example, a single packet processing engine may be adapted to handle a plurality of ports or a plurality of packet processing engines may be used, one for each port. Similarly, a single queue manager per line card may be used or a plurality of queue managers may be used, one for each packet processing engine (in the case multiple packet processing engines are realized). Further, the switch CPU subsystem may be incorporated on the same card as the switching matrix or may be realized on a separated card in the chassis.

Each of the line cards comprises a card CPU subsystem 123 for providing the control, administration and configuration of the line card. A detailed block diagram of the CPU subsystem suitable for use in both the line card CPU subsystem and the switch card CPU subsystem is shown in FIG. 13. The CPU subsystem, generally referenced 140, comprises a central processor 144, e.g., CPU, and both volatile and non-volatile memory including RAM memory 150 for storing data and application program code, Flash memory 148 and/or ROM memory 152 for storing boot and application code and EEPROM 146 for storing configuration data. The provider switch may also comprise magnetic storage device means for storing application programs and data. The CPU communicates to the packet processing engine, memory peripherals and other support devices via a bus 142. Note that depending on the implementation, the line cards may not have a CPU subsystem or may have a minimal CPU subsystem, such as without external interfaces.

The central processor 144 implements the major functionality of the control and management planes of the line card including higher software layer processing. Note that the central processor may be implemented in any suitable form such as a microcontroller, microprocessor, microcomputer, ASIC core, FPGA core, central processing unit (CPU) or digital signal processor (DSP) or any other computing means.

The CPU subsystem also comprises a NIC 154 for providing an out of band interface for connecting to external entities such as a craft for local maintenance and configuration purposes, an NMS 158 for centralized provisioning, administration and control or a Local Area Network (LAN). The CPU subsystem switch may comprise additional interfaces, such as a serial interface for connecting to a PC for configuration purposes. Note that these interfaces are typically part of the CPU subsystem that manages the chassis.

The network device also comprises an optional user interface adapted to respond to user/operator inputs and commands and to provide feedback and other status information. A host/user interface 156 enables communication with a user or host-computing device 159. The host may be adapted to configure, control and maintain the operation of the provider switch. Note that these interfaces are typically part of the CPU subsystem that manages the chassis.

In the ingress direction, data output from the queues on each of the line cards is forwarded to the switching matrix. The switch matrix implements the switching fabric (switching matrix block 136) for providing the switching functionality of the provider switch. A switch CPU subsystem 134 (described supra) provides a centralized processing function for the switch matrix. The switch CPU subsystem may also serve as the central CPU for the chassis, optionally residing on a separate card and managing chassis resources such as fans and power, as well as providing a single point of management for the entire chassis, i.e., representing the other cards to the user or craft. The switch CPU subsystem may comprise the CPU subsystem shown in FIG. 13 and described hereinabove. Note that depending on the specific implementation, the switching matrix may comprise, for example, hardware for performing VLAN tagging, MPLS, Frame Relay, ATM switching, CSIX, OIF-SPI.4, or any other switch matrix to network interface protocol.

In the egress direction, the switch matrix forwards the traffic towards the egress port, through the egress queue. It is important to note that the egress queue is the destination queue and does not participate in the queue control message processing mechanism of the present invention. The egress queue sends flow control to the switch matrix when it becomes full (or almost full). The switch matrix propagates the flow control to the relevant ingress queues, which are those that sent packets towards that egress queue. These ingress queues do perform the scheme of the present invention and process the flow control in accordance therewith.

A plurality of provider switches may be connected to each other using any topology. The switches may support any kind of a switching technology, including MAC-based switching, VLAN-based switching, MPLS, ATM, etc. Alternatively, the network may comprise only provider edge switches whereby a plurality of provider edge switches are connected in a ring topology.

The provider switch comprises computer readable storage medium for storing program code and data which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the mechanism of the present invention for supporting committed over excess traffic is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform mechanisms and methods of the present invention or any portion thereof may also reside, in whole or in part, in the static or dynamic main memories or in firmware within the processor of the switch (i.e. within microcontroller, microprocessor, microcomputer, DSP, etc. internal memory).

In alternative embodiments, the methods of the present invention may be applicable to implementations of the invention in integrated circuits, field programmable gate arrays (FPGAs), chip sets or application specific integrated circuits (ASICs), network processors, DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of regulating committed traffic over excess traffic in a distributed queuing system, said method comprising the steps of:

monitoring a level of a queue in a line card within said system, said queue having a first destination associated therewith;

upon said level exceeding a threshold, first dropping excess traffic to said first destination and sending a first drop excess traffic message to one or more other line cards within said system; and upon receipt of a second drop excess traffic message sent from another line card, second dropping excess traffic associated with a second destination specified within said second drop excess traffic message.

2. The method according to claim 1, further comprising the step of waiting a period of time after sending said first drop excess traffic message before sending further messages.

3. The method according to claim 1, further comprising the step of starting a send timer upon sending said first drop excess traffic message and waiting for expiration of said send timer before sending further messages.

4. The method according to claim 3, wherein the duration of said send timer is set relative to queue size between said threshold level and full level.

5. The method according to claim 1, further comprising the step of starting a stop timer upon receipt of said second drop excess traffic message and stopping to drop excess traffic upon expiration thereof.

6. The method according to claim 5, wherein the duration of said stop timer is set relative to queue size and average queue emptying rate.

7. The method according to claim 5, wherein the duration of said stop timer is set to permit emptying of a queue corresponding thereto.

8. The method according to claim 1, wherein discard eligible traffic is dropped while a send timer, started upon sending said first drop excess traffic message, is less than a stop timer, started upon receipt of said second drop excess traffic message.

9. The method according to claim 1, wherein said first drop excess traffic message and said second drop excess traffic message comprise:
   a first field operative to indicate a drop excess traffic command; and
   a second field operative to indicate a specific destination for which excess traffic is to be dropped.

10. The method according to claim 1, further comprising the step of sending a stop dropping excess traffic message to one or more line cards after waiting a period of time after sending said first drop excess traffic message.

11. The method according to claim 1, further comprising the step of sending a stop dropping excess traffic message in response to a cleared congestion condition.

12. The method according to claim 1, further comprising the step of sending a stop dropping excess traffic message in response to a cleared congestion condition utilizing hysteresis wherein different thresholds are associated with sending said first drop excess traffic message and sending said stop dropping excess traffic message.

13. The method according to claim 1, wherein said first drop excess traffic message is sent to one or more other line cards within said system only if said level exceeding a threshold and flow control is received on said first destination.

14. An apparatus for regulating committed traffic over excess traffic in a distributed queuing system, comprising:
   a monitor operative to monitor a level of a queue on a line card in said system, said queue having a first destination associated therewith;
   a message handler operative to send and receive queue control messages to and from other line cards within said system;
   a controller coupled to said monitor and said message handler, said controller operative to:
   if the level of said queue exceeds a threshold, drop excess traffic to said first destination and send a first drop excess traffic message to one or more other line cards within said system; and
   upon receiving a second drop excess traffic message from another line card, drop excess traffic associated with a second destination specified within said second drop excess traffic message.

15. The apparatus according to claim 14, further comprising means for waiting a period of time after sending said first drop excess traffic message before sending further messages.

16. The apparatus according to claim 14, further comprising means for starting a send timer upon sending said first drop excess traffic message and waiting for expiration of said send timer before sending further messages.

17. The apparatus according to claim 16, wherein the duration of said send timer is set relative to queue size between said threshold level and full level.

18. The apparatus according to claim 14, further comprising means for starting a stop timer upon receipt of said second drop excess traffic message and stopping to drop excess traffic upon expiration thereof.

19. The apparatus according to claim 18, wherein the duration of said stop timer is set relative to queue size and average queue emptying rate.

20. The apparatus according to claim 18, wherein the duration of said stop timer is set to permit emptying of a queue corresponding thereto.

21. The apparatus according to claim 14, wherein discard eligible traffic is dropped while a send timer, started upon sending said first drop excess traffic message, is less than a stop timer, started upon receipt of said second drop excess traffic message.

22. The apparatus according to claim 14, wherein said first drop excess traffic message and said second drop excess traffic message comprise:
   a first field operative to indicate a drop excess traffic command; and
   a second field operative to indicate a specific destination for which excess traffic is to be dropped.

23. The apparatus according to claim 14, further comprising means for sending a stop dropping excess traffic message to all other line cards after waiting a period of time after sending said first drop excess traffic message.

24. The apparatus according to claim 14, further comprising means for sending a stop dropping excess traffic message in response to a cleared congestion condition.

25. The apparatus according to claim 14, further comprising means for sending a stop dropping excess traffic message in response to a cleared congestion condition utilizing hysteresis wherein different thresholds are associated with sending said first drop excess traffic message and sending said stop dropping excess traffic message.

26. The apparatus according to claim 14, wherein said first drop excess traffic message is sent to all other line cards within said system only if said level exceeding a threshold and flow control is received on said first destination.

27. A method of regulating committed traffic over excess traffic in a distributed queuing system, said method comprising the steps of:
   monitoring a level of a queue in a line card within said system, said queue having a first destination associated therewith;
   if said level exceeds a threshold and flow control is received for said first destination, first dropping excess traffic to said first destination and sending a first drop excess traffic message to all other line cards within said system; and
   upon receipt of a second drop excess traffic message sent from another line card, second dropping excess traffic associated with a second destination specified within said second drop excess traffic message.

28. The method according to claim 27, further comprising the step of waiting a period of time after sending said first drop excess traffic message before sending further messages.

29. The method according to claim 27, further comprising the step of starting a send timer upon sending said first drop excess traffic message and waiting for expiration of said send timer before sending further messages.

30. The method according to claim 29, wherein the duration of said send timer is set relative to queue size between said threshold level and full level.

31. The method according to claim 27, further comprising the step of starting a stop timer upon receipt of said second drop excess traffic message and stopping to drop excess traffic upon expiration thereof.

32. The method according to claim 31, wherein the duration of said stop timer is set relative to queue size and average queue emptying rate.

33. The method according to claim 31, wherein the duration of said stop timer is set to permit emptying of a queue corresponding thereto.

34. The method according to claim 27, wherein said first drop excess traffic message and said second drop excess traffic message comprise:
   a first field operative to indicate a drop excess traffic command; and
   a second field operative to indicate a specific destination for which excess traffic is to be dropped.

35. The method according to claim 27, further comprising the step of sending a stop dropping excess traffic message to all other line cards after waiting a period of time after sending said first drop excess traffic message.

36. The method according to claim 27, wherein said first drop excess traffic message is sent to all other line cards within said system only if said level exceeding a threshold and flow control is received on said first destination.

37. An apparatus for regulating committed traffic over excess traffic in a distributed queuing system, comprising:
   first means for monitoring a level of a queue in a line card within said system, said queue having a first destination associated therewith;
   second means for dropping excess traffic to said first destination and sending a first drop excess traffic message to all other line cards within said system if said level exceeds a threshold and flow control is received for said destination; and
   third means for dropping excess traffic associated with a second destination specified within a second drop excess traffic message upon receipt of said second drop excess traffic message sent from another line card.

38. The apparatus according to claim 37, further comprising means for waiting a period of time after sending said first drop excess traffic message before sending further messages.

39. The apparatus according to claim 37, further comprising means for starting a send timer upon sending said first drop excess traffic message and waiting for expiration of said send timer before sending further messages.

40. The apparatus according to claim 39, wherein the duration of said send timer is set relative to queue size between said threshold level and full level.

41. The apparatus according to claim 37, further comprising means for starting a stop timer upon receipt of said second drop excess traffic message and stopping to drop excess traffic upon expiration thereof.

42. The apparatus according to claim 41, wherein the duration of said stop timer is set relative to queue size and average queue emptying rate.

43. The apparatus according to claim 41, wherein the duration of said stop timer is set to permit emptying of a queue corresponding thereto.

44. The apparatus according to claim 37, wherein said first drop excess traffic message and said second drop excess traffic message comprise:
   a first field operative to indicate a drop excess traffic command; and
   a second field operative to indicate a specific destination for which excess traffic is to be dropped.

45. The apparatus according to claim 37, further comprising means for sending a stop dropping excess traffic message to all other line cards after waiting a period of time after sending said first drop excess traffic message.

46. The apparatus according to claim 37, further comprising means for sending a stop dropping excess traffic message in response to a cleared congestion condition.

47. The apparatus according to claim 37, further comprising means for sending a stop dropping excess traffic message in response to a cleared congestion condition utilizing hysteresis wherein different thresholds are associated with sending said first drop excess traffic message and sending said stop dropping excess traffic message.

48. The apparatus according to claim 37, wherein said first drop excess traffic message is sent to all other line cards within said system only if said level exceeding a threshold and flow control is received on said first destination.

* * * * *